United States Patent
Kelley et al.

(10) Patent No.: US 9,487,079 B2
(45) Date of Patent: Nov. 8, 2016

(54) AIR INLET AND CLEANER ARRANGEMENT FOR WORK VEHICLE

(71) Applicant: DEERE & COMPANY, Moline, IL (US)

(72) Inventors: Christopher P. Kelley, Asbury, IA (US); William R. Farrar, Dubuque, IA (US); Alan D. Stahl, Dubuque, IA (US); Douglas A. Thomas, Dubuque, IA (US)

(73) Assignee: Deere & Company, Moline, IL (US)

( * ) Notice: Subject to any disclaimer, the term of this patent is extended or adjusted under 35 U.S.C. 154(b) by 87 days.

(21) Appl. No.: 14/456,957

(22) Filed: Aug. 11, 2014

(65) Prior Publication Data

US 2016/0039278 A1    Feb. 11, 2016

(51) Int. Cl.
  *B60K 13/02*  (2006.01)
  *F02M 35/16*  (2006.01)
  *F02M 35/02*  (2006.01)

(52) U.S. Cl.
  CPC .......... *B60K 13/02* (2013.01); *F02M 35/0204* (2013.01); *F02M 35/161* (2013.01); *F02M 35/164* (2013.01); *B60Y 2200/411* (2013.01)

(58) Field of Classification Search
  CPC ...... B60K 13/02; B60K 13/00; B60K 13/06; F02M 35/00; F02M 35/164; F02M 35/161; F02M 35/0204; F02M 35/20; F02M 35/0212; F02M 35/0216; F02M 35/04; F02M 35/048; E02F 9/0866; E02F 9/0891; E02F 9/0833
  USPC ................................................ 180/68.3, 309
  See application file for complete search history.

(56) References Cited

U.S. PATENT DOCUMENTS

| | | | | |
|---|---|---|---|---|
| 4,080,184 A * | 3/1978 | Petersen | ................ | B01D 45/12 137/351 |
| 4,469,490 A * | 9/1984 | Wilson | ..................... | B60H 3/06 180/68.2 |
| 4,689,060 A * | 8/1987 | Koske | .................. | F02M 35/164 180/68.1 |
| 6,874,589 B1 * | 4/2005 | Williams | ............... | B60K 13/02 180/68.1 |
| 7,717,205 B2 * | 5/2010 | Kertz | ..................... | B60K 13/04 180/68.1 |
| 7,861,814 B2 * | 1/2011 | Hageman | ............... | B60K 13/02 180/68.1 |
| 8,499,870 B2 | 8/2013 | Nakamura et al. | | |
| 8,695,827 B2 * | 4/2014 | Klauer | .................... | B60K 13/04 141/369 |
| 8,851,224 B2 * | 10/2014 | Hayashi | ................. | B60K 13/04 180/296 |
| 8,919,469 B2 * | 12/2014 | Shatters | ................. | B60K 11/00 180/68.1 |
| 8,960,359 B2 * | 2/2015 | Nogami | ................. | B60K 11/06 180/296 |

(Continued)

*Primary Examiner* — James M Dolak
(74) *Attorney, Agent, or Firm* — Lorenz & Kopf, LLP (57) ABSTRACT

An air inlet arrangement is provided for a work vehicle that has an auxiliary bay external to the engine compartment. The auxiliary bay can have a bay cover in part forming a step panel for the operator. The auxiliary bay contains an air cleaner coupled to an air inlet via air ducting that extends through the engine compartment. In the case of work vehicles having an aftertreatment device within the engine compartment for example, the air duct extends through the engine compartment between a side wall of the engine cover and the engine and/or the aftertreatment device. The air duct can at least in part be formed as a unitary part of the engine cover with multiple tube segments of differing cross-sections. At least the segment passing between the engine cover and the aftertreatment device can be oblong with a major axis essentially parallel to the engine cover side wall.

18 Claims, 9 Drawing Sheets

(56) References Cited

U.S. PATENT DOCUMENTS

| | | | | |
|---|---|---|---|---|
| 8,997,915 B2* | 4/2015 | Hayashi | ................ | B60K 13/04 |
| | | | | 180/296 |
| 9,169,619 B2* | 10/2015 | Aoyama | .............. | F02M 35/164 |
| 9,316,136 B2* | 4/2016 | Kobayashi | ............. | B60K 13/04 |
| 9,334,786 B2* | 5/2016 | Himoto | ................ | E02F 9/0866 |
| 9,353,502 B2* | 5/2016 | Hayashi | ................ | E02F 9/0866 |
| 9,353,503 B2* | 5/2016 | Yabe | .................... | E02F 3/3411 |
| 9,388,729 B2* | 7/2016 | Himoto | ................. | E02F 9/0866 |
| 9,394,668 B2* | 7/2016 | Sakai | .................... | E02F 3/7631 |
| 9,416,701 B2* | 8/2016 | Morimoto | ................ | F01N 3/00 |
| 9,416,757 B2* | 8/2016 | Pettersson | ........ | F02M 35/10137 |
| 2010/0071978 A1* | 3/2010 | Kisse | ................... | F02M 35/022 |
| | | | | 180/68.2 |
| 2013/0239802 A1 | 9/2013 | Troxell | | |
| 2013/0292386 A1 | 11/2013 | Klauer et al. | | |

* cited by examiner

AIR INLET AND CLEANER ARRANGEMENT FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to engine intake air arrangements, and in particular to air inlet and cleaner arrangements for work vehicles.

BACKGROUND OF THE DISCLOSURE

Work vehicles, such as various construction, forestry and agricultural machines, often operate in off-road environments with dust, dirt and other air-borne particles in the air. Air filters and cleaners are used to reduce or eliminate such air-borne contaminants present in the engine intake air stream. Ordinarily, such air cleaners are located within the engine compartment in close proximity to the intake manifold or other engine air flow control device.

Modern work vehicles often have emission control devices, commonly referred to as "aftertreatment" devices, used to reduce nitrogen oxides (NOx) and particulate matter in the exhaust stream. Such aftertreatment devices may be in the form of selective catalytic reduction to lower NOx, and a diesel oxidation catalyst may also be included to reduce remaining particulate matter. Alternatively or in addition, the aftertreatment devices may provide cooled exhaust gas recirculation to reduce NOx paired with an exhaust filter, such as a diesel particulate filter, to reduce particulate matter. In certain vehicle platforms, one or more of these aftertreatment devices may be mounted to the chassis beneath or to the side of the vehicle outside of the engine compartment. However, that may not be possible in some vehicle platforms (e.g., to maintain a minimum ground clearance and the like), in which case one or all of these aftertreatment devices may be mounted within the engine compartment. Available space within the engine compartment, which is often already limited, is thus further reduced. Nonetheless certain components needed for sustained combustion of the engine, such as certain fuel and air delivery components, must, at least in part, be mounted or pass through the engine compartment. The space constraints are worsened in vehicle platforms having a vertical exhaust stack in which exhaust components may also be contained in the engine compartment.

SUMMARY OF THE DISCLOSURE

This disclosure provides an air inlet arrangement for a work vehicle. Aspects of the disclosure may facilitate mounting emission control equipment within the engine compartment.

In one aspect, the disclosure provides a work vehicle, for example having a chassis supporting an engine and an aftertreatment device contained in an engine compartment defined by an engine cover having an air inlet opening. The work vehicle has an auxiliary bay external to the engine compartment. An air cleaner is disposed within the auxiliary bay. Air duct couples the air cleaner to the air inlet opening. The air duct is configured to extend into the engine compartment at least within an interior space defined between the engine cover and at least one of the engine and the aftertreatment device.

Another aspect of the disclosure pertains to a work vehicle having a chassis supporting an engine, an aftertreatment device and an air cleaner. The work vehicle includes at least one vehicle body panel defining an engine compartment containing the engine and the aftertreatment device and defining an auxiliary bay external to the engine compartment containing the air cleaner. An air duct couples the air cleaner to an air inlet opening in the at least one vehicle body panel. The air duct at least in part has a rigid section configured to extend at least into the engine compartment within an interior space defined between the engine cover and at least one of the engine and the aftertreatment device.

In still another aspect, the disclosure provides a work vehicle having a chassis supporting an engine, an aftertreatment device and an air cleaner. The work vehicle includes an engine cover having a top wall with an air inlet opening and upright side walls defining an engine compartment containing the engine and the aftertreatment device. A step panel defines a step platform and an auxiliary bay external to the engine compartment containing the air cleaner. A bay cover is coupled to the step panel to be movable between open and closed positions such that in the closed position the bay cover forms at least a part of the step platform. An air duct couples the air cleaner to the air inlet opening. The air duct can have a rigid section including an oblong segment extending along a reference axis and having an asymmetric cross-section with respect to the reference axis. The cross-section of the oblong segment defines a curved profile that is symmetric about at least one of a major axis and a minor axis, the major and minor axes being perpendicular and intersecting the reference axis of the oblong segment. The air duct extends within the engine compartment such that the major axis of the oblong segment is essentially parallel to at least one of the upright side walls of the engine cover.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed work vehicle having a new air inlet and cleaner arrangement, as shown in the accompanying figures of the drawings described briefly above. Various modifications to the example embodiments may be contemplated by one of skill in the art, and it should be understood that the disclosed air inlet and cleaner arrangement may be used with a variety of vehicles in a variety of settings. For example, while the air inlet and cleaner arrangement is described below as useful in situations where engine compartment space is limited, one or more features of the arrangement, such as the air inlet being a unitary weldment with an engine compartment panel and having an oblong cross-section, may be implemented in situations without the attendant space restrictions.

Thus, the disclosure provides an air inlet and cleaner arrangement in which the air cleaner may be disposed outside of the engine compartment, thereby providing space in the compartment for the engine and one or more emissions control or "aftertreatment" components without needing to expand it to an undesirably large size. Put another way, the arrangement may permit locating both the engine and aftertreatment components in the same engine compartment without compromising the air intake system. The air intake arrangement described herein also may permit the incorporation of a vertical exhaust stack, in combination with one or more aftertreatment components, while providing a direct ducting path between the aftertreatment components and the exhaust stack, reducing or eliminating a need to reroute exhaust ducting.

While the air cleaner itself may be located external to the engine compartment, air intake ducting may extend from an intake disposed on one of the engine compartment panels such as the ceiling panel, through the engine compartment, and through an opening disposed on another of the engine compartment panels, before coupling to the air cleaner.

The aftertreatment components may be positioned above the engine in the engine compartment and disposed laterally toward one of the side panels forming the compartment, thereby forming an interior void configured to receive the air intake ducting, the void running vertically between an opposite compartment side panel and one or more of the aftertreatment devices and the engine.

In certain configurations, the lateral width of the engine compartment may be a factor in determining an acceptable engine compartment size. Thus, the air intake ducting may have an oblong or ovalized cross-section at least in the area near an intersection with the top compartment panel. The ducting may be oriented such that its major axis may be essentially parallel to the engine compartment's adjacent upright side wall and, consequently, its minor axis may be essentially perpendicular to that side wall, i.e., in the lateral direction. An oblong or ovalized ducting oriented in this manner may have the same or larger cross-sectional area compared to a circular cross-sectioned duct fitting into the same lateral width of the interior void. Thus, the air intake arrangement also may permit uncompromised or even increased air input into the system.

In other configurations, the air intake may include a rigid duct segment external to an engine compartment panel, such as a top panel, and a rigid duct segment internal to the panel. These duct segments, in combination with the top panel and/or a bracket surrounding the internal ducting near the top panel, may form a single, unitary weldment. Additionally, the two duct segments may be portions of a single, unitary duct element that passes through a complementary opening in the engine compartment panel. Thus, the air intake arrangement may be viewed as a manner of forming a rigid air inlet, keeping air inlet ducting acceptably spaced away from the engine or aftertreatment devices. This arrangement also may provide for a tightly sealed air inlet, increasing the amount of air that makes it into the air filter.

In still other configurations, the air filter may be disposed in an auxiliary bay located external to the engine compartment. The auxiliary bay and engine compartment may share a wall, e.g., at least a part of one of the engine compartment panels also may serve as a side wall to the auxiliary bay. That panel may include an opening configured to receive air intake ducting passing from the interior void of the engine compartment to the auxiliary bay in order to operatively couple to the air filter.

In even further configurations, the auxiliary bay may double as a step to assist an operator in entering and exiting the vehicle cab. Thus, the air inlet and cleaner arrangement may be viewed as a way to incorporate a step into a vehicle or as a way to incorporate the elements of an engine, an air intake system, and aftermarket components into a vehicle already having a step. Additionally, a portion of the step surface may be hinged or otherwise removable, thereby providing an entrance into the auxiliary bay for accessing the air cleaner, which may facilitate maintenance or replacement of the air cleaner when needed.

As will become apparent from the discussion herein, the disclosed system and method may be used advantageously in a variety of settings and with a variety of machinery. In certain embodiments, referring now to FIG. 1, the disclosed system and method may be implemented with regard to a crawler dozer 20, referred to herein for simplicity as a crawler. It will be understood, however, that the disclosed system and method may be used for various other vehicles or non-vehicle platforms, including various crawlers of different configurations or designs than the crawler of FIG. 1.

Figure 1:
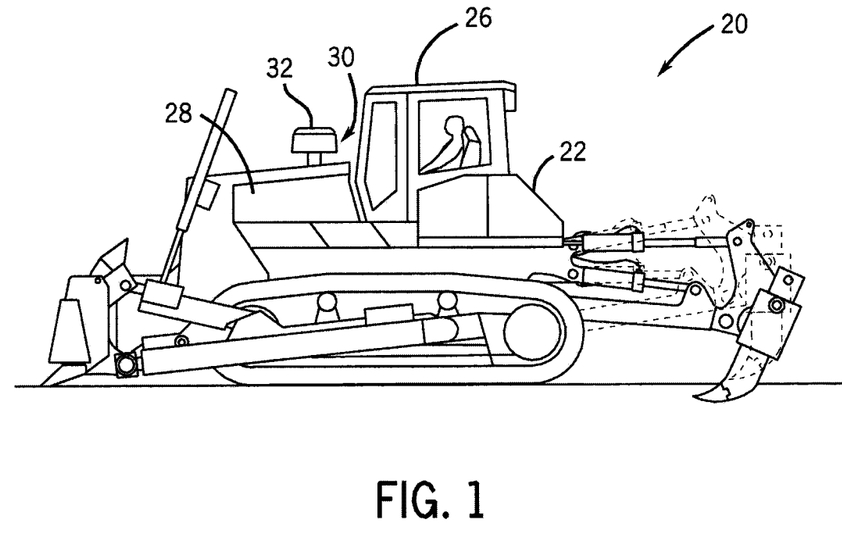
FIG. 1 is a perspective view of an example work vehicle in the form of a crawler dozer having an air inlet and cleaner arrangement as disclosed herein.
Figure 2:
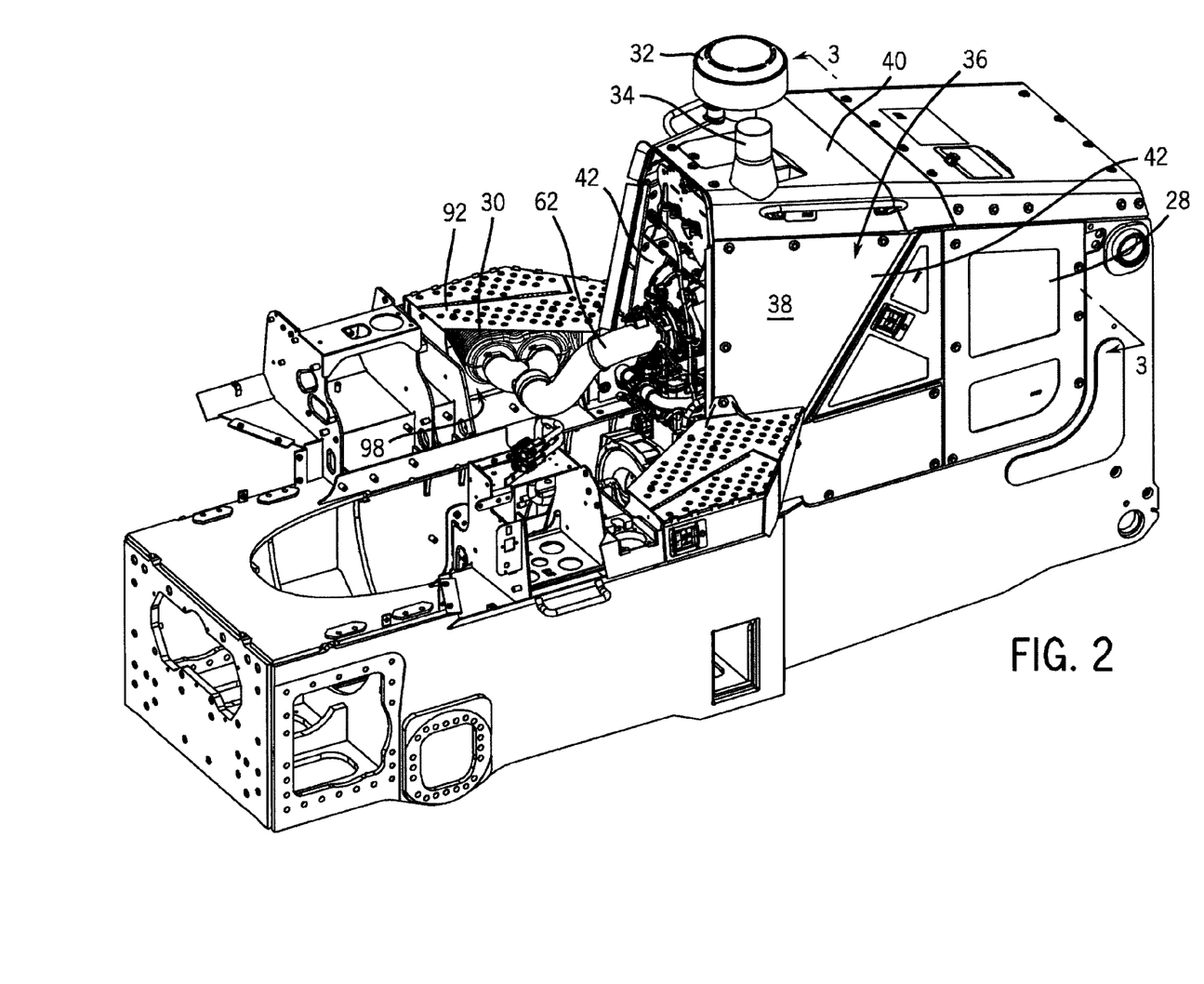
FIG. 2 is a partial perspective view of the power head thereof, including an engine cover, a step panel, an engine, an aftertreatment device and the air inlet and cleaner arrangement.
Figure 3:
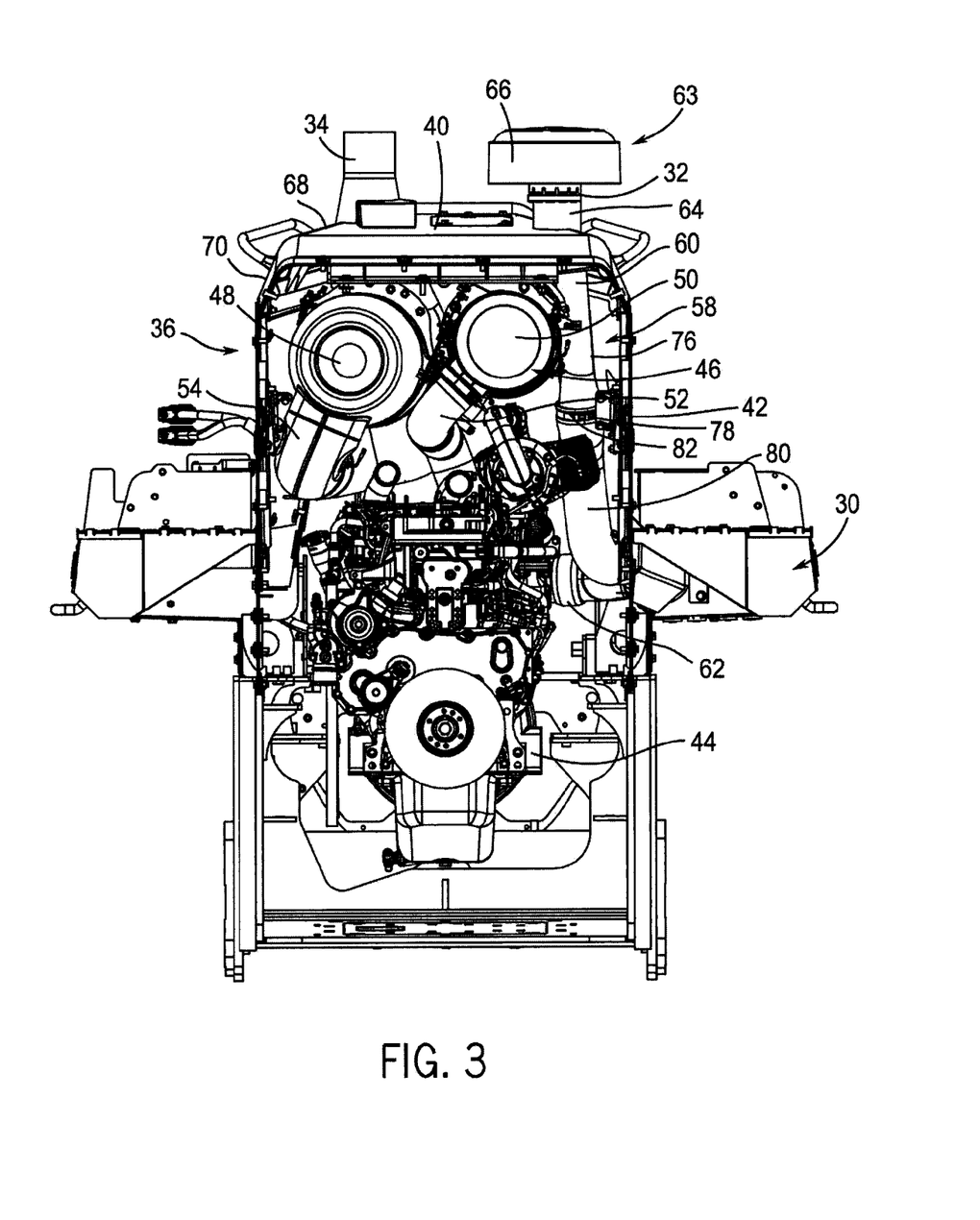
FIG. 3 is a front sectional view thereof taken along line 3-3 of FIG. 2.

The crawler 20 is presented in a partial perspective view in FIG. 1, with the front of the crawler 20 facing to the left. Accordingly, certain right-side components of the crawler 20 may not be visible in FIG. 1. The crawler 20 may include a chassis 22 supported on track assemblies 24 or wheels (not shown), with a cab 26 to house an operator. The chassis 22 may include a power head 28 for supporting various components, including an air filter or cleaning system 30 having an air inlet 32, and as seen in FIGS. 2-3, an exhaust stack 34 and an air cleaner arrangement, an engine 44, and an emissions control or aftertreatment device 46. FIG. 1 shows a power head 28 as being located proximate a front end of the chassis 22, in front of the cab 26, although it will be appreciated that the power head 28 may be located at other positions along the chassis 22.

Turning now to FIG. 2, a partial perspective view of the power head 28 as seen from the opposite side of the crawler 20 as the view of FIG. 1 is shown. The power head 28 includes an engine cover or compartment 36 defined by a plurality of body panels 38 including a top panel or wall 40 and a plurality of side panels or side walls 42. The panels 38 may be coupled to one another, e.g., with one or more fasteners, so that they can be separated. Alternatively, the panels 38 may be fixedly coupled together, e.g., using rivets or welds. In yet another alternative, the panels 38 may be a unitary construct formed by bending or otherwise deforming a single piece of material.

Figure 6:
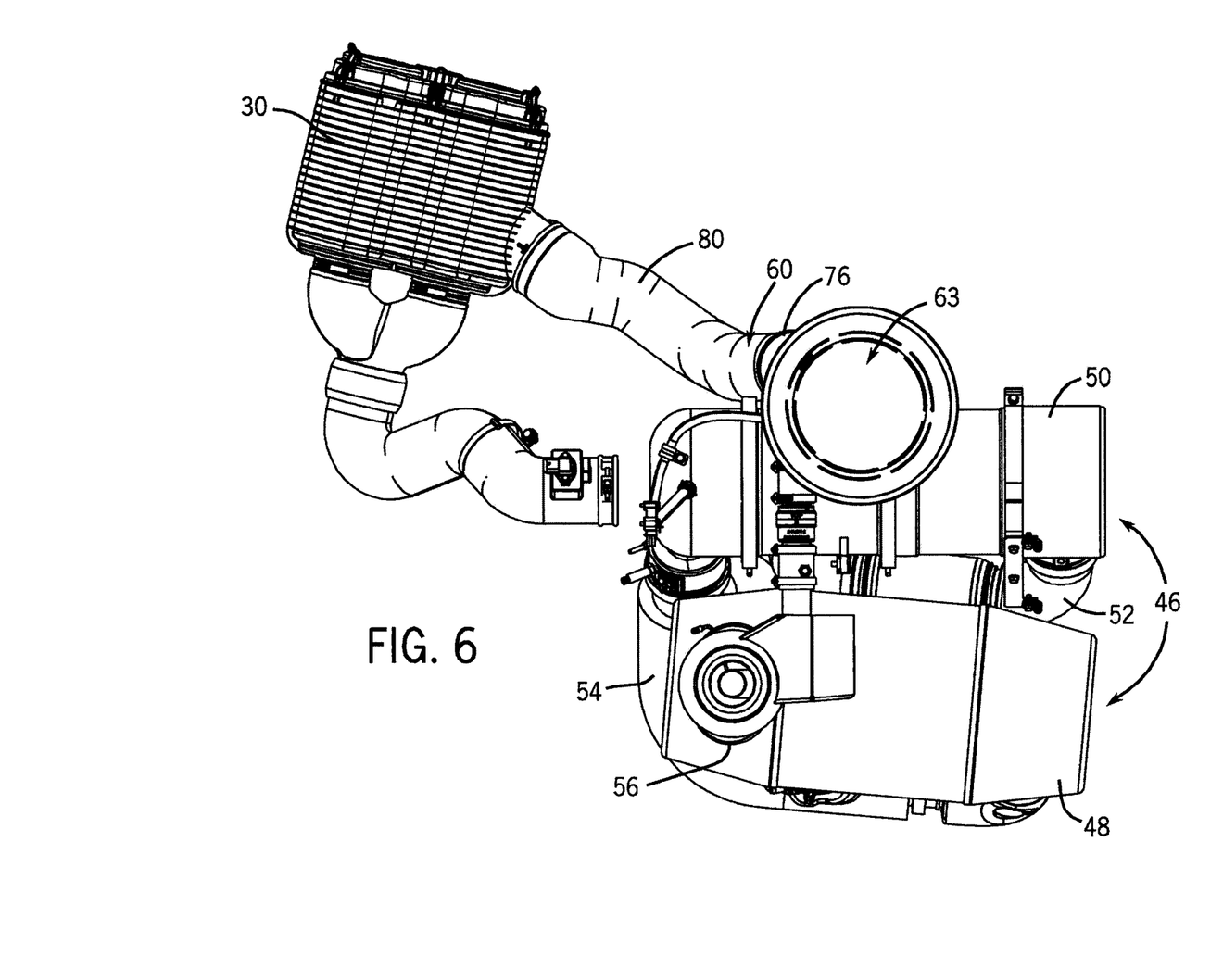
FIG. 6 is a top view showing the engine, the aftertreatment device and the air inlet and cleaner arrangement in isolation.

As best seen in FIG. 3, the engine compartment 36 may be configured to support and enclose an engine 44 and an aftertreatment device 46. In one aspect, the aftertreatment device 46 may include a fluid tank 48 such as a diesel exhaust fluid tank and a filter 50 such as a diesel particulate filter. First aftertreatment ducting 52 may operatively couple the engine 44 to the filter 50, second aftertreatment ducting 54 may operatively couple the filter 50 to the fluid tank 48, and third aftertreatment ducting 56 may operative couple fluid tank 48 to the exhaust stack 34, as best seen in FIG. 6. Other aftertreatment components may be employed, as would be appreciated by one of ordinary skill in the art.

The engine compartment 36 also may be configured to include an interior space or void 58 receiving ducting 60 operatively coupling the air inlet 32 to an air cleaner and ducting 62 operatively coupling the air cleaner to the engine 44. Significantly, however, the air cleaner may be disposed external to the engine compartment 36, as described in greater detail below, such that at least a portion of ducting 60 and ducting 62 proximate the air cleaner may be located outside of the engine compartment 36.

The aftertreatment device 46 may be sized and positioned above the engine 44, between the engine 44 and the top panel 40, and may occupy substantially all of the space in the engine compartment 36 between the engine 44 and the top panel 40, thereby limiting available space for locating ducting 60. Thus, as seen in FIG. 3, the interior space 58 may be positioned in a primary location extending along an upright side wall 42 of the engine compartment 36.

The air inlet 32 and exhaust stack 34 may extend through respective openings in the top panel 40, passing from the engine compartment 36 to the outside environment. The air inlet 32 may include a pre-cleaner 63 including an inlet pipe segment 64 in contact with the top panel 40 and a cap 66 operatively coupled to an upper end of the pipe segment 64.

In one aspect, the pipe segment 64 may terminate at a lower end proximate an exterior side 68 of the top panel 40. Ducting 60 then may terminate proximate an interior side 70 of the top panel, with the pipe segment 64 and ducting 60 being joined together to form an airflow path for intake air.

In another aspect, the pipe segment 64 may extend through an opening in the top panel 40, such that a lower end of the pipe segment 64 may be disposed proximate an interior side 70 of the top panel. In this instance, the pipe segment 64 and ducting 60 again may be joined together to form an airflow path, although this juncture may be located within the engine compartment 36 instead of at a boundary of the compartment.

Figure 9:
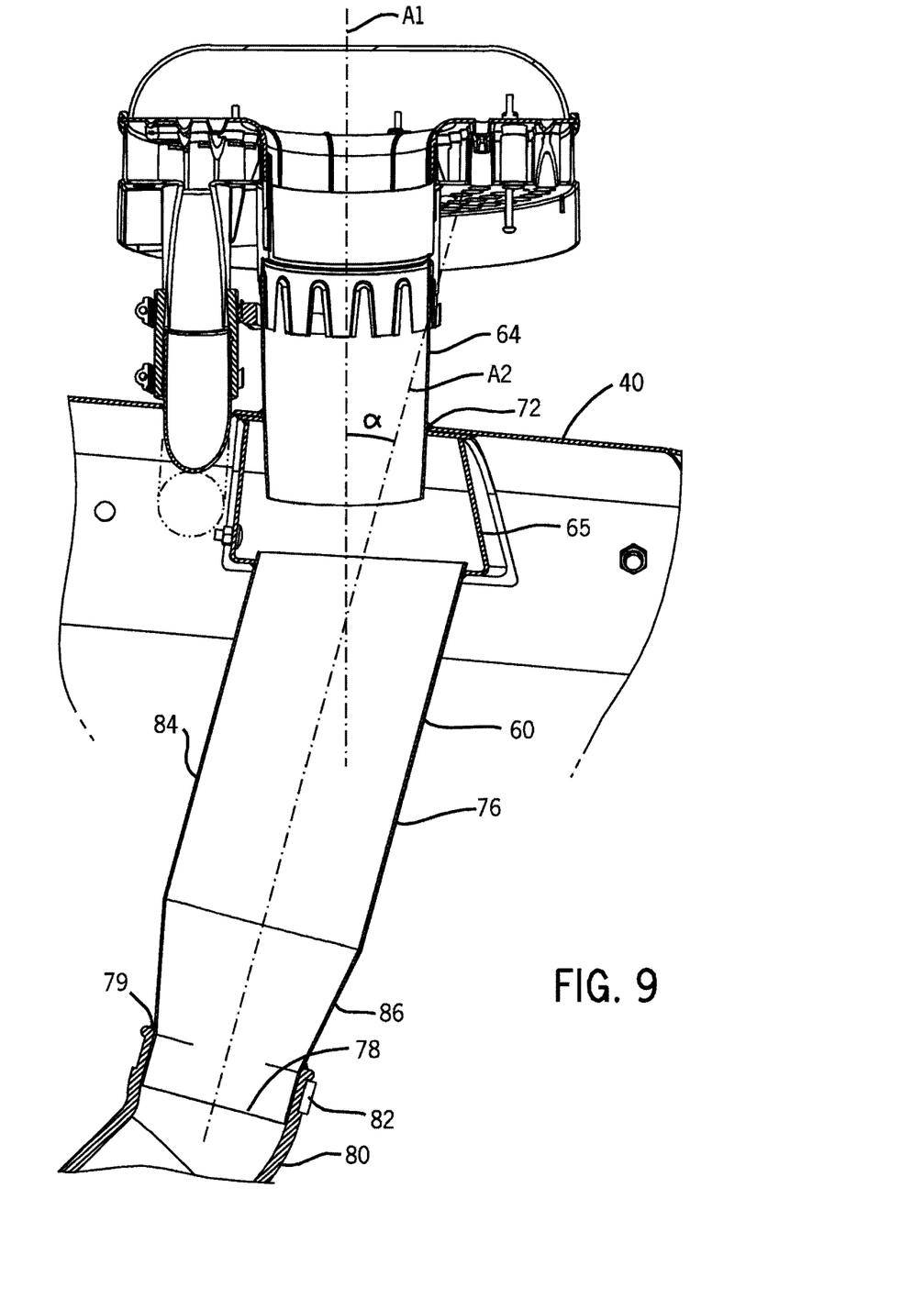
FIG. 9 is a partial sectional view showing an air inlet weldment with the engine cover.
Figures 10, 11:
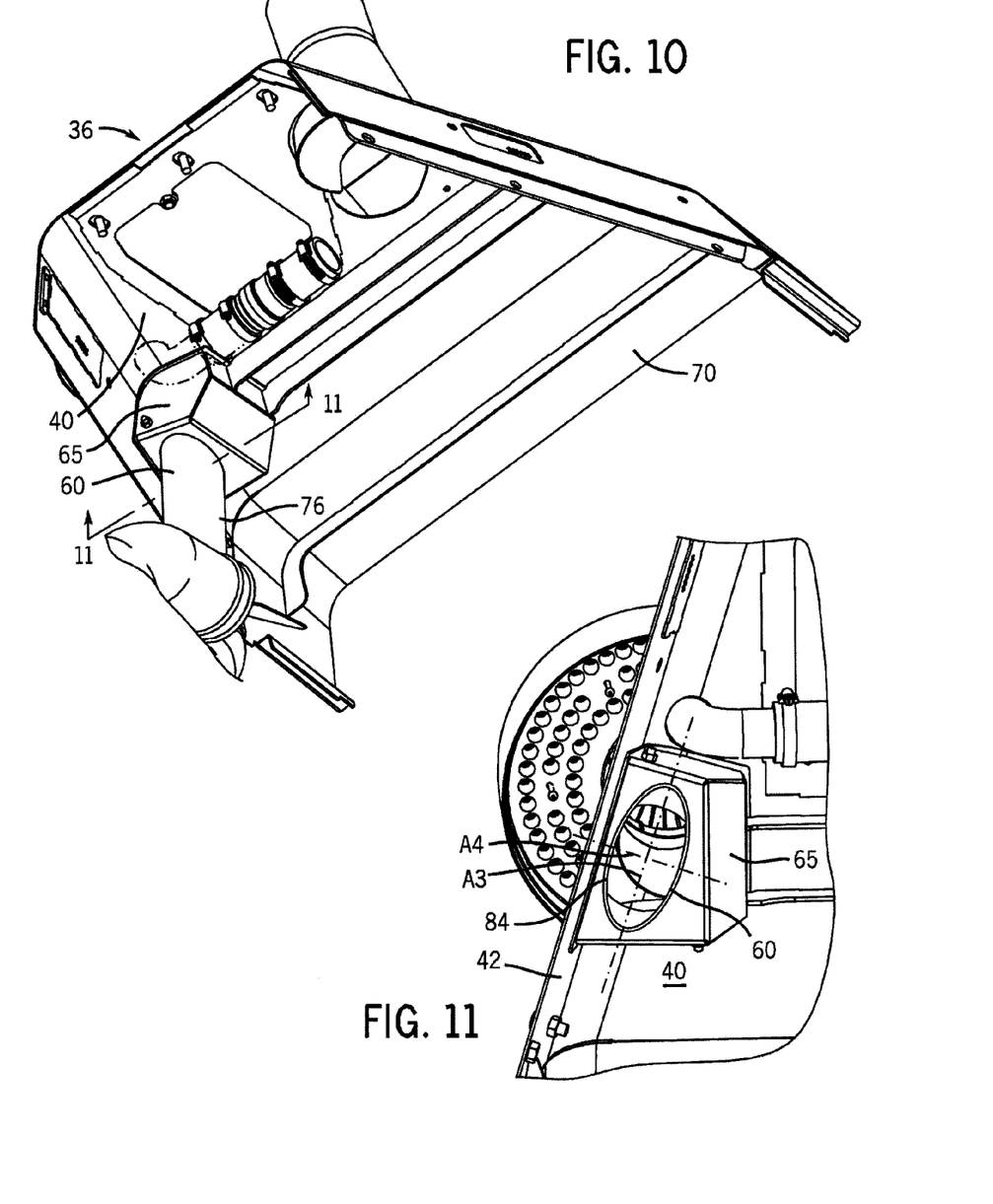
FIG. 10 is partial perspective view showing the air inlet weldment and the interior of the engine cover, shown without the engine and aftertreatment device.
FIG. 11 is a sectional view taken along line 11-11 of FIG. 10 and highlighting the air intake weldment.

Also referring to FIGS. 9-11, the pipe segment 64 and ducting 60 may be operatively coupled indirectly via a transition bracket 65. The transition bracket 65 may surround and encapsulate the adjacent open ends of the pipe segment 64 and ducting 60. Joints between the transition bracket 65, pipe segment 64 and ducting 60 may include continuous welds, thereby forming a substantially airtight seal and air path from the pipe segment 64 to ducting 60. Those open ends may be differently sized and shaped from one another, e.g., the pipe segment 64 may be round while the ducting 60 may be oblong, such that the bracket 65 may permit a fluid transition from one to the other. In addition to being coupled to or part of the air inlet 32, the transition bracket 65 may be coupled to the engine cover 36, e.g., at top panel 40, such as by welding or bolting. Assembly in this manner thus provides a weldment that includes at least part of the air inlet duct and at least part of the engine cover.

In yet another aspect, the pipe segment 64 and ducting 60 may be a single, unitary structure that passes through an opening 72 in the top panel 40.

In any of these aspects, one or both of ducting 60 and the pipe segment 64 may be secured to top panel. Securement may be such that a tight, substantially airtight seal is formed for the air path and a solid connection to the top panel 40 is made. Securement also may be releasable or permanent, provided that these conditions are achieved. One or both of ducting 60 and the pipe segment 64 may be integral with the top panel 40.

Thus, in one example, one, two, or all of ducting 60, the pipe segment 64, and the transition bracket 65 may be welded to each other if they are separate entities and to the top panel 40 whether they are separate or unitary. Alternatively, one, two, or all of ducting 60, the pipe segment 64, and the transition bracket 65 may be fastened to the top panel 40, such as by bolting the elements together.

In still another example, such as if the pipe segment 64 extends through the top panel and if no transition bracket 65 is used, the pipe segment 64 may be secured to the top panel 40 such as by welding, and ducting 60 may be secured to the pipe segment 64 such as by clamping, which may include the use of a gasket between ducting 60 and the pipe segment 64.

As seen in FIGS. 3 and 6, the filter 50 may overlap a lateral plane including the air pre-cleaner 63, thereby preventing the ducting 60 from descending vertically from the inlet 32 through the interior space 58. As such, ducting 60 disposed downwardly from the top panel 40 may be angled outward toward a side panel 42 when descending from the inlet 32, defining an offset angle between the pipe segment 64 and ducting 60.

Ducting 60 may be a rigid material such as steel, which may be easier than more pliant materials to retain in place within the interior space 58, away from the aftertreatment device 46 and engine 44. Rigid ducting 60 may extend from the top panel 40, through the engine compartment 36, to an outlet 74 in the side panel 42.

Alternatively, and as seen in FIGS. 3, 5, and 9-10, ducting 60 may include a first, rigid section 76 extending from proximate an opening 72 to a distal end 78 and a second flexible section 80, such as a flexible rubber hose, extending from the distal end 78 to or through the outlet 74. The rigid section 76 and flexible section 80 may be coupled to one another, e.g., through the use of a releasable hose clamp 82.

In order to accomplish deflection of ducting 60 around the aftertreatment device 46, an oblong segment 84 of the rigid section 76 may be asymmetric about a reference axis A1 along which it extends. In addition, the pipe segment 64 may extend about a second reference axis A2, where the first and second reference axes form an angle $\alpha$ with respect to one another, as best seen in FIG. 9. In addition, as seen in FIG. 11, the oblong segment 84 may be ovalized or have another curved profile when viewed in a cross-section taken perpendicular to the reference axis A1.

Despite being asymmetric about its reference axis A1, the oblong configuration of the oblong segment 84 may have a cross-section that is symmetric about at least one of a major axis A3 and a minor axis A4, where the major and minor axes are perpendicular and intersect the reference axis.

In one example, the oblong segment 84 of the rigid section 76 may extend up to and potentially including a proximal end proximate the top panel 40. The oblong segment 84 may be configured such that its major axis may be essentially parallel to at least one of the upright side walls, such as the side wall 42, of the engine cover 36, as best seen in FIG. 11.

The oblong segment 84 may be disposed between a substantially cylindrical portion of ducting having a circular cross-section, which may be coextensive with the inlet pipe segment 64 (although there may be a gap between the oblong segment 84 and inlet pipe segment 64 as discussed above and as shown in FIG. 9), and a flared segment 86 proximate and potentially including a distal end 78 of the rigid section 76, which may define a flange 79 for mounting the flexible hose section 80. Like the inlet pipe segment 64, the distal end 78 may have a substantially circular cross-section, which may facilitate secure, tight connection with the flexible section 80. The flared segment 86 may serve as a transition between the oblong segment 84 and the circular distal end 78.

Thus, with regard to ducting 60, the inlet pipe segment 64 may have a first circular cross-section, the oblong segment 84 may have a second cross-section that is non-circular and thus different from the first cross-section, the distal end 78 may have a third circular cross-section, such as at the flange 79, different from the second cross-section, and the flared segment 86 may have a converging cross-section transitioning between the second and third cross-sections.

In another aspect, ducting 60 may include a flexible material such as a rubber tube instead of the rigid section 76. In this aspect, ducting 60 may not be welded to the top panel 40 or the air pre-cleaner 63 but instead may be coupled securely, e.g., with fasteners, a hose clamp, or other coupling devices as would be appreciated by one of skill in the art. In order to retain ducting in position and provide sufficient clearance between the ducting 60 and the aftertreatment device 46, a flexible ducting may operatively engage one or more supports extending inward from the top panel 40 or the side panel 42.

Figure 4:
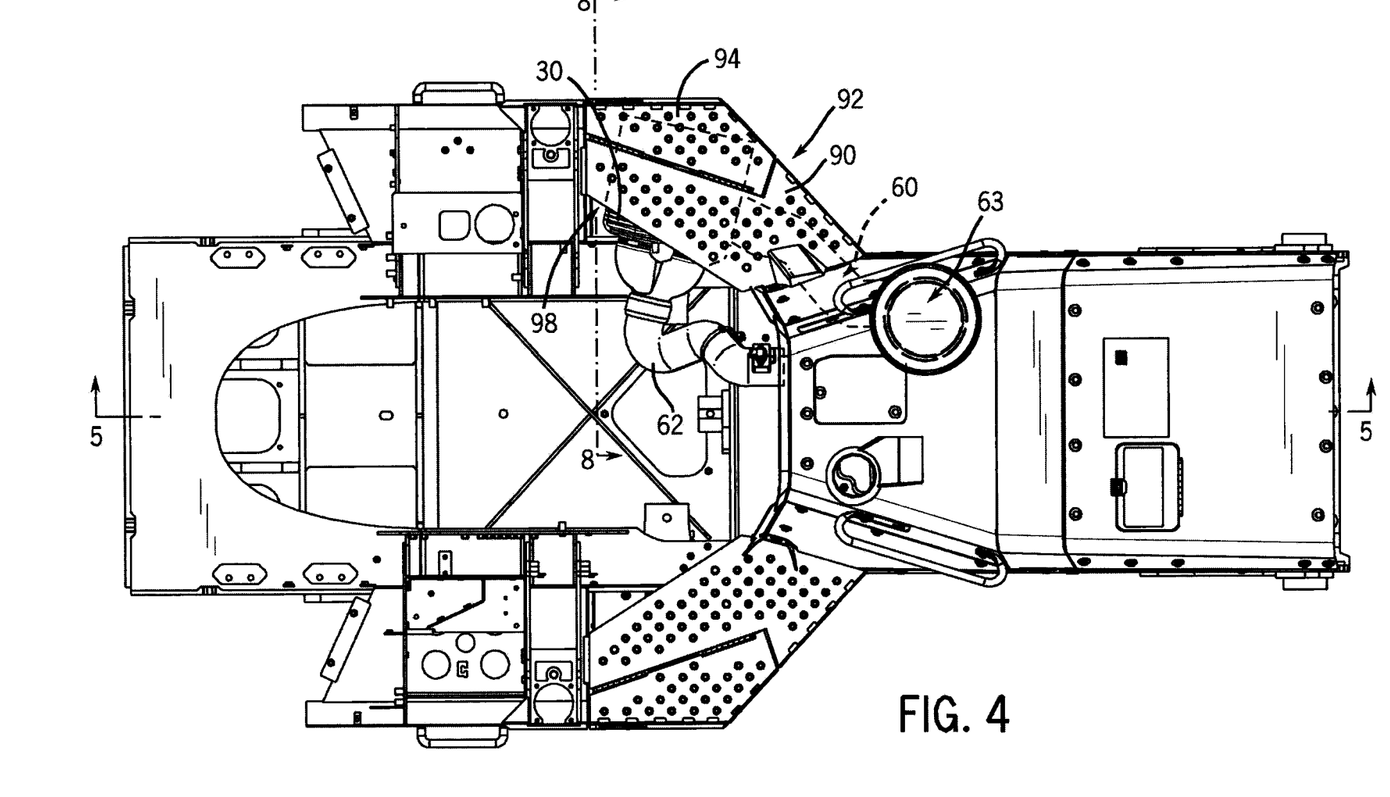
FIG. 4 is a top view thereof.
Figure 5:
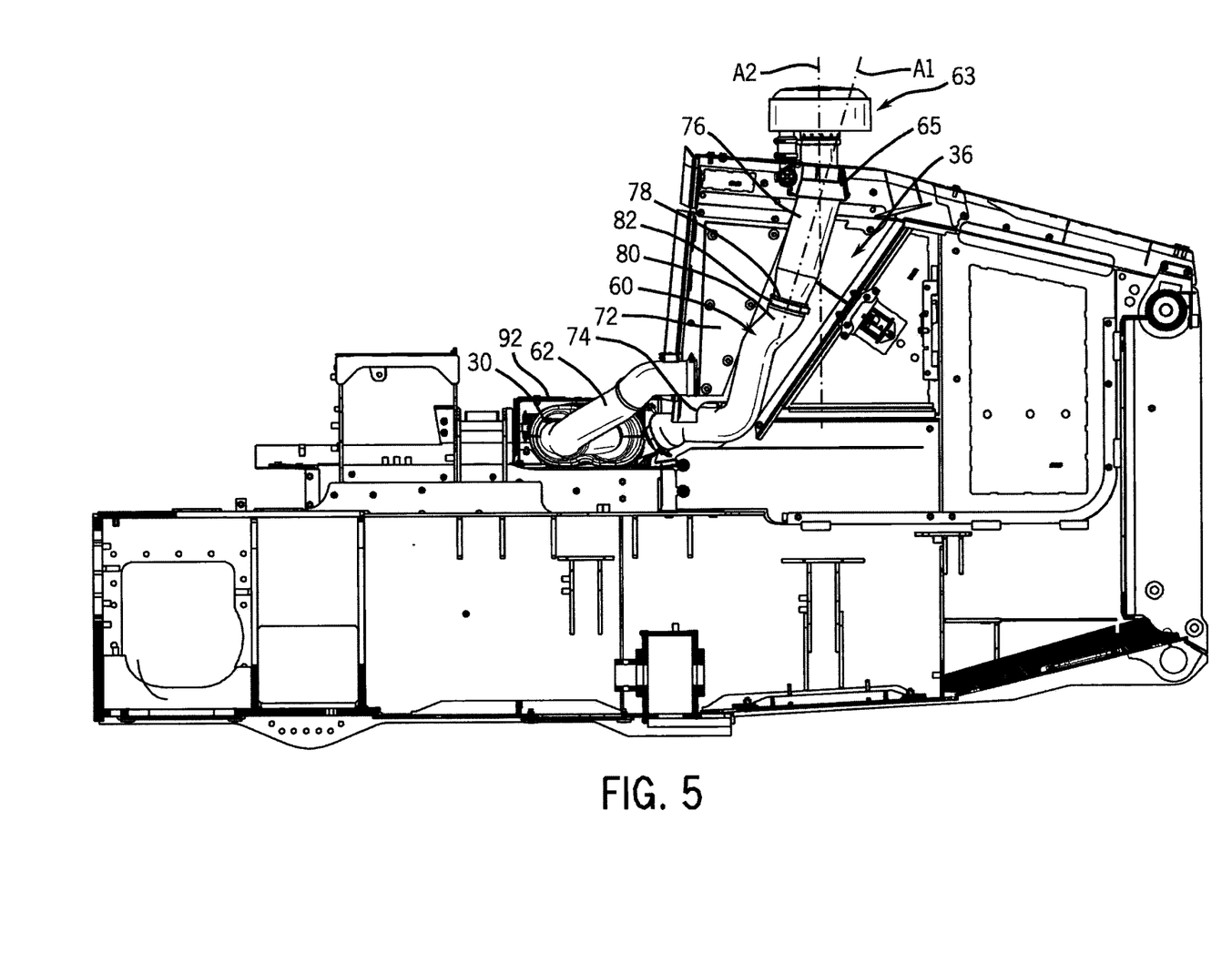
FIG. 5 is a side sectional view thereof taken along line 5-5 of FIG. 4, shown without the engine and aftertreatment device within the engine compartment.

Turning now to FIGS. 4-5, routing of ducting 60 through and outside of the engine compartment 36 is shown. In addition to deflecting laterally around the aftertreatment device 46 as seen in FIG. 3, these figures illustrate that the rigid section 76 may be angled rearwardly from the pre-cleaner 63 to the distal end 78, also to avoid contact with the aftertreatment device 46.

As seen in these figures, ducting 60 may extend through the outlet 74 in order to couple to the air filter 30, disposed external to the engine compartment 36 in an auxiliary bay 88. The auxiliary bay 88 may be defined at least in part by panels 38, including the side panel 42, and by a step panel 90 connected to the engine compartment 36 at the side panel 42. The step panel 90 may define a step platform 92 for assisting a user in entering the cab 26.

Figures 7, 8:
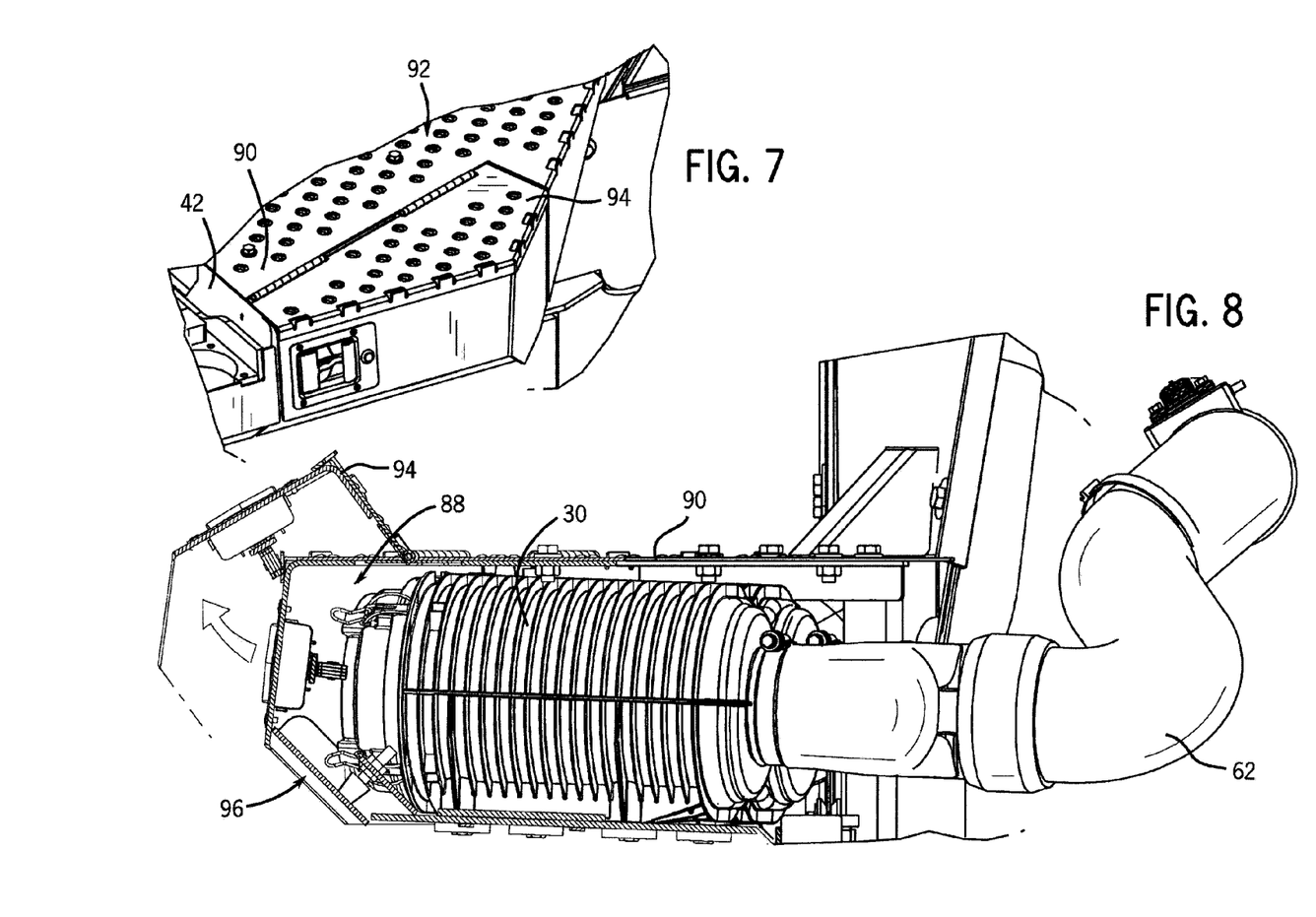
FIG. 7 is a partial perspective view showing an auxiliary bay with a bay cover in a closed position forming a part of a step platform.
FIG. 8 is a rear sectional view taken from line 8-8 of FIG. 4, showing the air cleaner within the auxiliary bay and the bay cover in an open, access position.

Turning to FIGS. 7-8, in order to access the auxiliary bay 88, such as for accessing or replacing the air filter 30, the step panel may include or attach to a bay cover 94. The bay cover 94 may be movable between an open position and a closed position, such as by hinged attachment with the step panel 90. When closed, the step panel 90 and bay cover 94 may combine to form the step platform 92, as seen in FIG. 7. Conversely, when open, area normally occupied by the bay cover 94 may serve as an opening 96 into the auxiliary bay 88, as seen in FIG. 8.

The step platform 92 also may include an open rear end 98, thereby permitting passage of the air cleaner 30 and ducting 62, such that the ducting 62 may have an unobstructed path to the engine 44, as best seen in FIGS. 2 and 4.

In this manner, the air cleaner 30 may be disposed external to the engine compartment 36, thereby eliminating a need to expand a size of the compartment to accommodate the air cleaner 30. At the same time, the air intake ducting 60 may be routed from a vertically mounted and oriented pre-cleaner 63 through the protected environment of the engine compartment. In addition, the oblong configuration of a portion of the ducting internal to the engine compartment may permit the ducting to avoid physical interference with both the engine 44 and aftertreatment device 46, and a welding attachment of the air intake ducting 60 to the engine compartment 36 may facilitate a strong, stable seal for intake air.

The terminology used herein is for the purpose of describing particular embodiments only and is not intended to be limiting of the disclosure. For example, the terms "upper," "lower," and the like may be used with respect to the relative orientation of a particular embodiment, but may not be intended to limit the disclosure to that orientation nor embodiment. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A work vehicle having a chassis supporting an engine and an aftertreatment device, the engine and the aftertreatment device being contained in an engine compartment defined by an engine cover, the work vehicle comprising:
   an auxiliary bay external to the engine compartment;
   an air cleaner disposed within the auxiliary bay; and
   an air duct coupling the air cleaner to an air inlet opening through the engine cover;
   wherein the air duct is extends into the engine compartment at least within an interior space defined between the engine cover and at least one of the engine and the aftertreatment device; and
   wherein the air duct has a rigid section including:
     a first tube segment having a first cross-section;
     a second tube segment extending from the first tube segment and having a second cross-section different than the first cross-section; and a third tube segment extending from the second tube segment and having a third cross-section defining a hose mounting flange.

2. The work vehicle of claim 1, wherein the auxiliary bay is defined at least in part by a step panel connected to the engine cover, the step panel defining a step platform.

3. The work vehicle of claim 2, wherein the step panel defines an opening leading to the auxiliary bay, and further including a bay cover attachable to the step panel for enclosing the opening to the auxiliary bay.

4. The work vehicle of claim 3, wherein the bay cover is hinged to the step panel and movable between open and closed positions, wherein in the closed position the bay cover forms a part of the step platform.

5. The work vehicle of claim 1, wherein the aftertreatment device is disposed within the engine compartment above the engine.

6. The work vehicle of claim 5, wherein the interior space extends along an upright side wall of the engine cover.

7. The work vehicle of claim 1, wherein the rigid section is an integral part of the engine cover.

8. The work vehicle of claim 7, wherein the air duct includes a flexible section coupled to the rigid section.

9. The work vehicle of claim 7, wherein the rigid section includes an inlet pipe that extends outside of the engine compartment.

10. The work vehicle of claim 9, further including a pre-cleaner coupled to the inlet pipe.

11. The work vehicle of claim 7, wherein the second cross-section is asymmetric about a reference axis along which the second tube segment extends.

12. The work vehicle of claim 11, wherein the second cross-section defines a curved profile.

13. The work vehicle of claim 12, wherein the second cross-section is oblong and the first and third cross-sections are circular.

14. The work vehicle of claim 13, further comprising a fourth tube segment extending between the second and third tube segments, and wherein the fourth tube segment has a converging cross-section transitioning from the second to the third tube segments.

15. The work vehicle of claim 11, wherein the first tube segment extends along a reference axis that intersects the reference axis of the second tube segment at an angle.

16. A work vehicle having a chassis supporting an engine, an aftertreatment device and an air cleaner, the work vehicle comprising:
    at least one vehicle body panel defining an engine compartment containing the engine and the aftertreatment device and defining an auxiliary bay external to the engine compartment containing the air cleaner; and
    an air duct coupling the air cleaner to an air inlet opening in the at least one vehicle body panel, the air duct at least in part having a rigid section extending at least into the engine compartment within an interior space defined between the at least one vehicle body panel and at least one of the engine and the aftertreatment device;
    wherein the rigid section includes:
    an oblong segment extending along a reference axis and having an asymmetric cross-section with respect to the reference axis;
    a circular cross-section hose mounting flange; and
    a converging segment transitioning from the oblong segment to the hose mounting flange.

17. The work vehicle of claim 16, wherein the at least one vehicle body panel defines an engine cover having a top wall and a side wall extending along a side of the top wall;
    wherein the cross-section of the oblong segment defines a curved profile that is symmetric about at least one of a major axis and a minor axis, the major and minor axes being perpendicular and intersecting the reference axis of the oblong segment; and
    wherein the major axis of the oblong segment is parallel to the side wall.

18. The work vehicle of claim 16, wherein the at least one vehicle body panel at least in part defines a step platform and an opening leading to the auxiliary bay;
    further including a bay cover attachable to the at least one vehicle body panel for enclosing the opening to the auxiliary bay; and
    wherein the bay cover is hinged to the at least one vehicle body panel and movable between open and closed positions such that in the closed position the bay cover forms at least a part of the step platform.

* * * * *